United States Patent [19]

Mehta

[11] 3,951,907

[45] Apr. 20, 1976

[54] ELASTOMERIC AND PLASTOMERIC MATERIALS CONTAINING AMORPHOUS CARBONACEOUS SILICA

[75] Inventor: Povindar Kumar Mehta, El Cerrito, Calif.

[73] Assignee: The Regents of the University of California, Berkeley, Calif.

[22] Filed: July 23, 1973

[21] Appl. No.: 381,528

Related U.S. Application Data

[63] Continuation-in-part of Ser. No. 276,133, July 28, 1972.

[52] U.S. Cl. .......................... 260/42.46; 106/288 B; 260/37 R; 260/42; 260/42.47; 260/42.49; 260/42.52; 260/765; 423/435
[51] Int. Cl.$^2$ .................... C08K 3/04; C08K 3/36
[58] Field of Search ................ 106/288 B; 423/435; 260/42, 42.46, 42.47, 42.49, 42.52, 37 R, 765, 41.5 A

[56] References Cited
UNITED STATES PATENTS

| | | | |
|---|---|---|---|
| 2,428,252 | 9/1947 | Von Stroh | 260/41.5 A |
| 3,125,043 | 3/1964 | Gravel | 110/28 |
| 3,646,161 | 2/1972 | Marwede et al. | 260/41.5 A |
| 3,676,166 | 7/1972 | Louthan | 260/41.5 A |

OTHER PUBLICATIONS

Hackh's Chemical Dictionary (4th Ed.) (McGraw-Hill) (N.Y.) (1969), pp. 232–233.

Modern Plastics Encyclopedia 1968) (Sept. 1967), (McGraw-Hill) (N.Y.), pp. 580–581.

*Primary Examiner*—Donald E. Czaja
*Assistant Examiner*—H. H. Fletcher
*Attorney, Agent, or Firm*—Julian J. Schamus

[57] ABSTRACT

A composition of matter is disclosed which includes rubber, plastomer and elastomer materials, that is, natural and synthetic rubbers and polymeric materials commonly referred to as plastics containing as a filler material a carbonaceous siliceous material derived from organic agricultural material having high initial silica contents (for example, rice hulls) of up to about 28%; which carbonaceous siliceous material is obtained from the original organic agricultural material by a process of controlled incineration such that the resulting material contains minor residual impurities and small quantities of residual carbon and is amorphous in nature while retaining the original cellular structure of the agricultural material from which it is derived; the rubber; elastomeric and plastomeric compositions also may contain other ordinary components used in the preparation of such materials employing other fillers.

6 Claims, No Drawings

ELASTOMERIC AND PLASTOMERIC MATERIALS CONTAINING AMORPHOUS CARBONACEOUS SILICA

BACKGROUND OF THE INVENTION

This application is a continuation in part of application Ser. No. 276,133 filed July 28, 1972.

This invention relates to novel compositions of matter and more particularly to novel compositions comprising organic polymeric material including natural rubber, synthetic elastomers (rubber) and plastomers, containing as a filler or reinforcing material a highly reactive, highly amorphous, anhydrous material derived from agricultural matter, which agricultural matter has a high initial silica content of up to about 28%, and which material comprises from about 49% to about 98% silica, the balance being mainly residual carbon and non-volatile inorganic constituents of the organic plant material from which the said material is derived. The amorphous silica material herein referred to is more completely described below and in application Ser. No. 276,133.

PRIOR ART

As indicated in U.S. Pat. No. 3,208,823, (Baker), it is well known that silica finds application as a filler or reinforcing agent rubber; and according to the Baker patent, it is desirable that the silica be in finely divided condition. As pointed out by the Baker patent, however, it is ordinarily quite expensive to produce the silica in the particle size required for its use as an additive or filler to rubber compositions.

It has also been indicated, for example, in U.S. Pat. No. 3,110,606 (Bertorelli) that silica containing additives do not develop good physical strength in rubber compositions and that silica tends to violently retard vulcanization.

SUMMARY OF THE INVENTION

In my prior co-pending application (Ser. No. 276,133) filed July 28, 1972, I have disclosed a process for the preparation of a substantially amorphous silica composition prepared from silica containing plant material; and I have in that application indicated that the material therein disclosed finds utility as a filler for such materials as natural and synthetic rubber and other plastic materials.

It has been found that the inclusion in polymeric material (natural or synthetic rubber or other elastomeric and plastomeric materials which are described more fully hereinbelow) of from 5 by weight to 95% by weight of a substantially amorphous, anhydrous material derived from organic or agricultural matter, which agricultural matter has a higher initial silica content of up to about 28%, in which material comprises from about 49 to about 98% silica, the balance being mainly residual carbon and non-volatile inorganic constituents of the original organic plant material, produces highly desirable polymer based material. This carbonaceous siliceous material has attractive characteristics that are not available either from carbon black or from the known high purity silica materials used as fillers.

It has also been found that when the amorphous silica material prepared from organic plant material is ground to a particle size of approximately less than 2 microns (as explained hereinafter) prior to addition to the unvulcanized rubber product, a final polymer based material of highly desirable properties results.

Due to the mode of preparation of the amorphous silica material used in this invention, it is generally completely anhydrous and retains an outline of the basic cellular structure of the organic material from which it is derived. Depending upon the temperatures to which it is subjected during its preparation, the amorphous silica material employed in this invention can be produced with surface areas in excess of ten square meters per gram and often in excess of 100 square meters per gram prior to grinding.

Because the amorphous silica prepared from such organic materials as rice hulls is not totally free from residual carbon, the material is black, and thus has the advantage that unlike prior silica additives to rubber compositions it may be used in the preparation of non-white rubber material without the need to wash the color with carbon black.

It is therefore an object of this invention to provide a novel composition of matter comprising a natural or synthetic rubber material or other elastomer or plastomer containing as a filler or additive from 5 to 95% of a substantially amorphous silica material derived from organic plant material having high initial silica content.

Another object of this invention is to provide an improved rubber composition.

A further object is to provide an improved plastomer composition.

A still further object is to provide an improved elastomer composition.

Further objects of the invention will become apparent from the detailed description of the invention which follows:

DETAILED DESCRIPTION OF THE INVENTION AND PREFERRED EMBODIMENTS

In my prior copending application, Ser. No. 276,133, I have disclosed as a new composition of matter, a highly amorphous, anhydrous material derived from organic agricultural matter, which agricultural matter has a high initial silica content of up to about 28%, which new composition comprises from about 49 to about 98% silica, the balance being mainly residual carbon and non-volatile inorganic constituents of the organic plant material. The residual carbon is generally removable upon extended heating to give a composition containing from about 0.3 to no more than about 2% residual carbon (as determined by loss on ignition) and from about 1 to about 5% of minor non-volatile impurities, other than CaO.

A preferred embodiment of the composition comprises the above composition wherein the silica content of the material is from 75 to about 98%. It is to be pointed out that the novel silica composition disclosed in application Ser. No. 276,133 is characterized in that it retains the basic cellular structure outline of the organic material from which it is derived, and generally is characterized by a high surface area of in excess of 10 square meters per gram. In one embodiment of the invention, it is believed that a novel silica composition of this invention, after its initial preparation, contains about 2% carbon (as determined by loss on ignition tests) which is apparently trapped within the amorphous silica structure of the material or completely coated with amorphous silica so that its removal by thermal processes is difficult, if not impossible, without further physical treatment.

As noted above, the novel silica composition disclosed in application Ser. No. 276,133 often contains minor impurities which are primarily the non-volatile inorganic residue of the organic material from which it is prepared. Principally, it has been found that in addition to very small quantities of $Al_2O_3$, $Fe_2O_3$, $Mn_2O_3$ and some trace elements present in all natural organic materials, the siliceous material of this invention may contain from about 1 to about 2% potassium oxide ($K_2O$), up to about 1.5% $SO_3$, and $Na_2O$ as well as CaO may be present.

Due to the mode of preparation of the materials, it is generally completely anhydrous and retains an outline of the basic cellular structure of the organic material from which it is derived. Depending upon the temperatures to which it is subjected, the material can be produced with surface areas in excess of 10 square meters per gram, and often in excess of 100 square meters per gram.

The silica material disclosed in application Ser. No. 276,133 can be prepared by a process for the incineration of organic agricultural material having an initial silica content of up to about 28%, which process comprises heating the silica containing organic material at temperatures not in excess of about 1250°F for periods up to about 66 hours. In practice, it is sometimes desirable to first heat the silica containing materials such as rice hulls to about 400°F at which temperature carbonaceous gas is evolved in the form of dense odoriferous fumes accompanied by an exothermic reaction which gradually causes the temperatures to rise to approximately 900°F. Elevation of the temperature after completion of the exothermic reaction in an oxidizing atmosphere, for periods up to about 66 hours depending on the temperature, can lead to a product which is still highly amorphous and yet contains only minor quantities of residual carbon.

The preparation of the silica material disclosed in application Ser. No. 276,133 is more fully illustrated by reference to the following examples in which percentages are expressed by weight unless otherwise designated:

EXAMPLE I

A sample of rice hulls from the Sacramento, California, area (approximately 50 – 100 gr) were heated in an electric furnace. The sample was placed on the cool furnace and the temperature was gradually raised to about 300°F, at which temperature the sample began to turn dark brown. As the temperature was increased above 300°F, carbonaceous gases started to evolve and the fumes became quite dense and odorous at about 400°F. Without any increase in the electrical energy to the furnace, the sample temperature rose gradually to about 900°F, as monitored by a Chromel-Alumel thermocouple; indicating that the distillation or carbonization process was exothermic. When the temperature stabilized, samples of the material were withdrawn and subjected to further treatment and testing. The ash material withdrawn at this point was black, highly amorphous, had a very high specific surface and lost 45 – 50% of its weight upon ignition (carbonized matter).

EXAMPLE II

A small portion of the material from Example I (before conducting the loss on ignition test) was heated for 48 hours at temperatures ranging from 900° to 950°F. At the end of this time, the black ash had turned gray, but continued to exhibit a porous skeletal structure of high surface area and was highly amorphous.

EXAMPLE III

Another portion of the black material produced at about 900°F in Example I was heated for about one hour at between 1050° and 1100°F under oxidizing conditions. Again, the black ash turned gray, but retained the highly amorphous, high surface area character of the original black ash. Even after heating to about 1250°F, the gray ash retained its non-crystalline character. However, prolonged heating at above this temperature caused the material to convert (at least in part) first to the crystobalite and then the tridymite forms of crystalline silica.

Microscopic examination of the products of Examples I – III produced at 1250°F and below showed complete extinction under cross Nicols, indicating the complete absence of crystalline material. It also exhibited the porous skeletal structure of the silica of this invention as well as a very high surface area. The silica ash was also soft to the touch and disintegrated into fine particles on light grinding.

EXAMPLES IV – XII

Individual quantities of rice hulls, rice straw and horsetail weed (Equisetum) crushed to pass through a ¼ inch mesh screen were individually treated in an electric furnace by heating to about 400°F to initiate the exothermic carbonization or distillation reaction described in Example I above.

After the exothermic reaction was essentially complete, samples were removed for analysis and testing. The balance was subject to an oxidizing atmosphere for ½ hour at 1000°F, at which time a second sample was removed and the balance of the material was heated in the oxidizing atmosphere for an additional 1½ hours at between 1050° – 1100°F.

In the following table (Table I), Examples IV – VII represent respectively the test results obtained from the rice hull incineration at the end of the exothermic reaction (Example IV), after ½ hour at 1000°F (Example V) and after 1½ additional hours at 1050° – 1100°F (Example VI). Similarly, Examples VII – IX represent the three samples prepared by the same process from ground rice straw, while Examples X – XII are those prepared from horsetail weed.

Each sample was divided into small portions for determination of (1) total available silica, (2) loss on ignition, (3) surface area, (4) silica activity index, and (5) x-ray diffraction pattern.

Total available silica was determined by first determining loss on ignition, then leaching the carbon free sample with perchloric acid to dissolve all the remaining non-silica components and finally determining silica.

Loss on ignition was determined by heating a weighed portion of the material in a Pt. crucible at 1000°C in an oxidizing atmosphere for one hour, cooling and weighing and then reheating for 15 minutes and so forth until a constant weight was obtained upon cooling.

Surface area was determined by the standard B.E.T. nitrogen absorption method.

The "Silica activity index" is an indication of the reactivity of silica present in a material, and it is directly related to the degree of amorphousness of silica. This index has been developed to show the high degree of reactivity of the silica of this invention. The index is arrived at by experimentally determining the percentage of available silica which dissolves in an excess of boiling ½ N. NaOH in a 3-minute extraction in a stainless steel beaker on a −325 mesh sample.

When silica is truly amorphous, the characteristic x-ray diffraction peaks of crystalline forms of silica are absent. The degree of amorphousness, however, can be judged by the intensity or average height of the diffused band between 15° and 25° $2\theta$ using x-rays generated from a copper target with a nickel filter. Data reported in Table I in connection with relative x-ray diffraction intensity of the amorphous band is based on a full scale reading of ten inches which represents 200 counts per second.

furnace and the process by which it operates to prepare silica compositions within the scope of this present invention are disclosed and claimed in a companion patent application by Norman Pitt filed July 28, 1972, as Ser. No. 276,132, and now abandoned. The material produced for this example was amorphous, and showed from 12 to 14% loss of organic residue upon ignition (essentially unburned carbon); had an indicated surface area of 25.5 square meters per gram, a "Silica activity index" of 53 and was black in color.

EXAMPLE XIV

The process of Example XIII was repeated using, however, a large quantity of Arkansas rice hulls in place of Sacramento, California, area rice hulls. The

TABLE I

| Material | Total Available $SiO_2$% | Loss on Ignition % | Surface Area $M^2/g$. | Silica Activity Index | Relative Intensity of Amorphous Band by x-ray diffraction Counts/Second |
|---|---|---|---|---|---|
| Rice Hull Ash | | | | | |
| Ex. IV | 50 | 49.4 | 122 | 85 | 74 |
| Ex. V | 92 | 6.3 | 97 | 81 | 54 |
| Ex. VI | 93 | 4.5 | 76 | 79 | 54 |
| Rice Straw Ash | | | | | |
| Ex. VII | 54 | 44.0 | 49 | 60 | 46 |
| Ex. VIII | 85 | 12.0 | 22 | 61 | 40 |
| Ex. IX | 90 | 5.2 | 11 | 43 | 40 |
| Horsetail Ash | | | | | |
| Ex. X | 50 | 43.3 | 86 | 61 | 48 |
| Ex. XI | 75 | 12.8 | 81 | 63 | 32 |
| Ex. XII | 77 | 9.8 | 74 | 58 | 30 |

The data in Table I indicate that all the materials are highly reactive forms of silica in the non-crystalline or amorphous state. Unlike the material produced from rice hull or rice straw, the silica ash produced from horsetail weed contains residual $CaCO_3$. As shown by the chemical analysis in Table II, this accounts for at least a part of the greater loss on ignition shown for the ash prepared from horsetail weed in Table I.

The analyses shown in Table II are representative of the materials produced from the above examples.

product had 8.4% carbon, was grayish black and the chemical composition of the loss on ignition free product was similar to the ash prepared from the Sacramento, California, material.

EXAMPLE XV

A portion of rice hull ash from Example XIV was subjected to 1100°F for 66 hours under oxidizing conditions in an electric furnace. The resulting material showed only 0.3% loss of weight on ignition and had a

TABLE II

| Material | Ash Content % of Unburned Plant Material | Analysis of Ash — % of Ash | | | |
|---|---|---|---|---|---|
| | | $SiO_2$ | CaO | $K_2O$ | $Na_2O$ | Unanalyzed Residue ($Al_2O_3$ + $Fe_2O_3$ + $Mn_2O_3$) |
| Rice Hull Ash | 21.1 | 98.30 | — | 1.27 | 0.15 | 0.38 |
| Rice Straw Ash | 18.5 | 96.50 | — | 2.36 | 0.17 | 0.37 |
| Horsetail Weed Ash | 26.6 | 91.10 | 6.41 | 1.78 | 0.12 | 0.47 |

EXAMPLE XIII

A large quantity of the amorphous silica composition of this invention was prepared from Sacramento, California, area rice hulls in an inverted refractory furnace having tangential inlet means at the bottom for an airborne stream of rice hulls, means for initiating the exothermic reaction mentioned above and means for rapidly heating the ash and removing it from the bottom central portion of the cylindrical furnace. This surface area of 6.5 square meters per gram. The Silica activity index was still 50+%. This relatively pure form of amorphous silica was further characterized by a refractive index of 1.43 and a density of about 2.0. This rice hull silica ash was compared in physical properties to other forms of silicon oxide and the results are indicated in Table III.

TABLE III

| | Density g/cc | Index of Refraction | Silica Activity Index,% |
|---|---|---|---|
| Quartz | 2.65 | 1.55 | 0.05 |
| Crystobalite | 2.32 | 1.48 | 4 |
| Obsidian | 2.25 | 1.47 | 4 |
| Rice Hull Ash (0.3% carbon) Ex. XV | 2.0 | 1.43 | 50 |
| Rice Hull Ash Ex. XIII | | | 53 |

As noted above, the novel siliceous ashes of this invention are anhydrous when prepared. This has been demonstrated by conducting certain loss-on-ignition determinations referred to above under conditions of thermal gravimetric analysis. That is, the loss-on-ignition studies have been conducted while continuously weighing the sample. It was noted that all weight loss occurred at temperatures which indicated removal of residual carbon rather than removal of any hydrated material remaining after initial preparation of the ash.

The rubber and plastic aspects of this invention may be expressed as a new composition of matter comprising a material selected from the class consisting of rubber, elastomer and plastomer material containing as a filler from 5 to 95% by weight of a carbonaceous siliceous material derived from agricultural material having a high initial silica content by a process of incineration conducted under conditions whereby said siliceous material retains the basic cell structure of said agricultural material and is amorphous in character.

Compositions of this invention may be prepared from natural rubber and its derivatives, synthetic elastomers which may be referred to as synthetic rubbers (materials which can be elongated or deformed 100% and which recover nearly completely when the deforming force is removed). Other compositions of this invention may be prepared from materials generally referred to as plastics or plastomers which are non-rubber like in the sense that they do not require vulcanization and which are polymeric materials in nature.

The several different classes of elastic polymer materials that may be reinforced with the silica material derived from agricultural plant material comprise natural rubbers and their derivatives and the synthetic rubber-like elastomers (which have been defined by H. L. Fisher in Ind. Eng. Chem., 31, 941). These materials have been generally classified according to Fisher's classification of elastic materials. Fisher's study has shown that the elastic materials within his broad definition have made differences and it is not possible to predict exactly what effect the amorphous silica material used in this invention will have on the physical properties of each individual class. However, it is generally true that the silica material used in this invention may be employed to prepare a utilitarian product in any formulation of elastic materials wherein carbon black or silica containing reinforcing or extending materials may be employed, and will have the effect of giving the elastic composition improved tensile strength.

Thus the classes of elastic materials reinforced by the practice of the present invention are:
  I. Natural rubbers and their modifications, including chemical, interpolymeric, and mixed polymeric modifications.
  II. Rubberlike (i.e., vulcanizable synthetic elastomers, comprising:
    A. Non-polar dienic elastomers
      1. Homopolymers
      2. Multipolymers
    B. Polar dienic elastomers
      1. Homopolymers
      2. Multipolymers
    C. Non-dienic elastomers Classification II of elastic materials just given is intended to include all of the types of materials classified by H. L. Fisher as synthetic rubber in the reference hereinbefore cited. Fisher, in certain instances, utilizes the term "rubber-like" loosely in the sense of "elastic", whereas in the present specification, the word is used in the more exact sense of vulcanizable as distinguished from non-vulcanizable materials.

For brevity herein the specific classifications of elastic materials reinforced by the herein disclosed silica material according to the practice of this invention, are sometimes designated as follows:
  Class I - Rubbers (natural and modifications)
  Class II - Elastomers (synthetic, vulcanizable)

By the term "dienic" is meant any elastic or plastic material formed at least in part from butadiene or a derivative of butadiene, that is, from a polymerizable material containing a plurality of polymerizable ethylene linkages of which at least two are conjugated.

By the term "homopolymer" is meant the polymerization product of a single polymerizable monomer. For example, butadiene is homo-polymerized to polybutadiene.

By the term "copolymer" is meant the polymerization product obtained when two or more polymerizable monomers are copolymerized, that is simultaneously polymerized in the presence of each other. For example, butadiene and styrene are polymerized together to form a butadiene styrene copolymer.

By the term "interpolymer" is meant the polymerization product produced when two or more monomers are polymerized sequentially (called a "graft copolymer" in the Report on Nomenclature in Journal of Polymer Science, VIII, page 260, March 1952), or when one or more materials are polymerized (e.g., homo-, co-, or condensation-polymerized) in the presence of a polymer. For example, natural rubber is swollen with methyl methacrylate and the latter polymerized and the resulting product is an interpolymer. When the components of an interpolymer are inseparable from one another, then the newly created polymer is referred to as a "graft polymer". (See T. Alfrey, Jr., J. Bohrer, and H. Mark's book entitled Copolymerization published in 1952 by Interscience Publishers, Inc., New York, especially Chapter VIII).

By the term "mixed polymers" is meant a physical mixture of two or more polymers. For example, if polybutadiene and the copolymer of butadiene-styrene are intimately mixed either by blending their latices, then coagulating and drying, or by mill-blending the dry polymers, the resultant blends are mixed polymers.

The numerous examples given above and hereinafter are presented in tabular form to enable one skilled in the art to compare the same to thus obtain a better understanding of the advantages and broad application of this basic invention in the several fields concerned.

Class I includes the natural rubbers and their derivatives and modifications including Hevea, balata chicle, and other naturally occurring rubbers and by natural rubber derivatives; I mean not only the interpolymers of natural rubber and dienes, vinyls, and allyl monomers, but also the chemical derivatives of these and of natural rubbers, such as the hydrogenated, hydroxylated, chlorinated, hydrochlorinated and the like, and the plasticized products thereof. The technics of preparing the various natural rubber derivatives is well reviewed in J. Le Bras, A. Delalande and J. Duclaux' book entitled Les Derives Chimiques de Caoutchouc Naturel, published in 1950 in Paris, France, By Dunod. These various natural rubber derivatives can be reinforced by the herein disclosed silica material according to the practice of this invention.

The general purpose synthetic rubbers manufactured in quantity are the butadiene-styrene copolymers known as GR-S. Both hot and cold types of GR-S, as well as oil extended GR-S and carbon black masterbatched GR-S with or without oil addition are all effectively reinforced by the herein disclosed silica material according to the practice of this invention.

Class IIA-1 elastomers include the homopolymers of the dienes such as butadiene, isoprene, piperylene, 1,3-pentadiene, dimethyl butadiene, etc., and Class IIA-2 elastomers include the co-, inter-, and mixed polymers of said non-polar dienes with or without vinyl compounds and other non-polar materials containing a polymerizable ethylenic group. Other important members of the Class IIA-2 elastomers are the polymers containing two or more ingredients from the group comprising the non-polar dienes and other non-polar polymerizable ingredients, of which at least one ingredient must be a diene for the polymer to be vulcanizable. Examples of such Class IIA-2 elastomers are:

1. two or more dienes; e.g., butadiene-isoprene copolymer rubber.

2. one or more dienes with one or more vinyls; e.g., butadiene-styrene copolymer rubber, ethylene-propylene-diene tripolymer rubbers in which the small amount of diene is usually non-conjugated such as cyclooctadiene, dicyclopenta-diene, and divinyl-benzene, and other rubbers prepared from alphaolefins and polyolefins and containing residual unsaturations.

3. one or more dienes with one or more non-vinyl compounds containing a polymerizable ethylene linkage, e.g., the isoprene-isobutylene copolymer, after emulsification in water to form a latex.

4. Any of (3) with one or more vinyls added. In the vinyls just mentioned, there are, of course, included styrene, vinyl toluene and alpha-methyl styrene when copolymerized with an equimolar content of a polymerization-aiding vinyl monomer such as styrene or vinyl toluene. In the GR-S types of butadiene styrene copolymers in this class there is also one member including a small proportion of a cross-linking agent, that generally used being divinylbenzene, to reduce the polymer shrinkage while retaining its elastomer properties, and it is not intended to exclude such material, as the presence of the anti-shrinking agent in the elastomer being reinforced does not interfere with the reinforcement of the material by the herein disclosed silica material according to the practice of this invention.

The isoprene-isobutylene copolymers (butyl rubbers) while by classification members of the Class IIA-2 group elastomers, are not of the GR-S type because (1) they are not copolymers of a diene and a vinyl, but are copolymers of a diene and isobutylene, and (2) the diene isoprene is present in very low concentrations of the order of 5% as compared to the 72% butadiene content of GR-S 100.

Butadiene-acrylonitrile copolymer is an example of subclass IIB-2. In this class of elastomers homologues of butadiene can be used in conjunction with or in place of the butadiene and in addition other polymerizable polar organic compounds can be used in place of or in addition to the acrylonitrile. Such other polar compounds include: vinylaldehydes and detones, e.g., acrolein, methacrolein, vinyl methyl ketone, methyl isopropenyl ketone; vinyl acids, e.g., acrylic acid, methacrylic acid, cinnamic acid and their esters prepared from saturated and unsaturated alcohols, phenols, etc.; polar derivatives of non-polar vinyls such as the halogen derivatives of styrene and of vinyl toluenes; nitrogen containing vinyl compounds, such as methacrylonitrile, vinylpyridine and the vinyl substituted pyridines; and polymerizable halogen hydrocarbons, e.g., trichloroethylene, 1, 1-difluoroethylene.

Class IIC elastomers comprise elastic and plastic materials not containing butadiene or a substituted butadiene yet vulcanizable by curing systems, even though without sulfur. The polyalkene sulfide, Thiokol, is an example of this class which also includes the ethylenepropylene rubber, and other rubbers prepared from alphy olefins, and the halocarbon rubbers especially the fluorocarbon rubbers, curable by peroxide or amine curing systems, the lactoprene polymers not including dienic components and utilizing an ester exchange or halogen replacement reaction for vulcanization purposes; the elastoplastics including mixed glyptals as defined by H. Fisher and which are vulcanizable; the polyesters including those containing residual unsaturation and curable by an organic peroxide curing system; and the polyesters which are vulcanized through terminal carboxyl or hydroxyl groups, for instance, by reaction with a polyisocyanate forming the so-called isocyanate polyester elastomers of the Vulcollan type.

Another aspect of this invention is a plastic material reinforced with the herein disclosed silica material derived from agricultural plant material. By plastic material is meant polymeric materials which may be referred to as either plastomers or non-vulcanizable elastomers.

The term plastomers refers to H. Fisher's class of plastomers which include subclasses (a) the true Thermoplastics, and (b) the thermosetting plastics. The term non-vulcanizable elastomers included H. Fisher's subclassification of elastolene and elastoplastics under his general classification of elastomers, excluding therefrom vulcanizable materials that are more properly included in the rubber-like (vulcanizable) elastomers class.

Polyvinyl chloride and polyvinylidene chloride and copolymers thereof with and without plasticizer, especially a copolymer of vinyl-chlorida-vinylidene chloride, have become very important plastomers and are reinforced by the herein disclosed silica material according to the practice of this invention. No attempt will be made to discuss the numerous variations of vinyl chloride and vinylidene chloride polymers and copolymers, and the many different types of plasticizers which can be used.

An excellent review of the polyvinyl chloride type plastomers and a discussion of the similarities thereof, is found in the text Polyvinylchlorid and Vinychlorid- Mischpolymerisate by Franz Kainer, published in 1951 by Springer-Verlag, Heidelberg, Germany.

In more detail, the plastomers and non-vulcanizable elastomers include the following: polymers from monomers containing polymerizable ethylenic linkages, other than vinyl polymers, with or without other polymerizable constituents, e.g., sulfur dioxide or vinyl constituents, such as polyethylene, polypropylene, polyisobutylene, polysulfones (e.g., isobutylene-sulfur dioxide copolymers), isobutylene-styrene copolymers, and the like; polymers prepared from vinyl monomer or monomers, e.g., styrene, vinyl toluene and alpha methyl styrene; from halogenated vinyl compounds, e.g., chlorostyrene, vinyl chloride, vinyldene chloride, perfluoroethylene, trifluorochloroethylene, propylene, etc., from the vinyl acids and their esters, e.g., acrylic acid, methacrylic acid, ethyl acrylate, methyl methacrylate, etc.; from vinyl ethers, e.g., vinyl ethyl ether; from vinyl alcohols and their esters. e.g., vinyl alcohols, vinyl acetate, the acrylates and fluorinated acrylesters and vinyl butyrate; from vinyl ketones, e.g. methyl vinyl ketone, methyl isopropenylketone, etc.; and from nitrogen containing vinyl monomers, e.g., vinyl pyridine or acrylonitrile. Copolymers, mixed polymers and interpolymers of vinyl monomers are included in this definition together with any other organic compounds which can join thereto. If a diene is used in forming such plastomers and non-vulcanizable elastomers, the plastomer must be hydrogenated, halegnated, hydrohalogenated, hydroxylated or otherwise treated to remove the unsaturation, otherwise, the unsaturated materials would be capable of vulcanization and therefore classified as elastomers.

The cellulose derivatives meeting this definition are also reinforced by the herein disclosed silica material according to the practice of this invention, for example, the cellulose ether derivatives such as methyl cellulose, ethyl cellulose, hydroxyethyl cellulose, carboxy methyl cellulose, etc.; and the cellulose ester derivatives, e.g., cellulose acetate and cellulose nitrate. The reinforcement of these cellulose derivatives is also effective when such are plasticized.

The plastomers and non-vulcanizable elastomers and mixture thereof with Class I and II elastomers are all reinforced by the herein disclosed silica material according to the practice of this invention.

The examples given in this specification are typical and illustrate the principles of the invention, however, such examples are in no sense to be construed as the maximum results obtainable using the herein disclosed silica material according to the practice of this invention to reinforce elastic and plastic materials.

EXAMPLES XVI AND XVII

To illustrate the utility and advantages of the use of the carbonaceous silica containing material as a filler in a black colored elastomer, batches of SB-R 1502 (a styrene-butadiene copolymer containing 23% bound styrene) were prepared for vulcanization in individual batches, one containing a carbonaceous silica material disclosed hereinabove and the other containing a carbon black.

The batches were mixed on a roller mill with full cooling water on the rolls. After mixing the batches were allowed to stand for 16 hours and were then remilled prior to molding test sheets. The molded test sheets were allowed to rest for 24 hours prior to conducting physical property tests. The molding was conducted in a 50 ton press having electrically heated platens. The samples were cured for 30 minutes at 300°F. Compression-set discs were prepared and cured for 35 minutes at 300°F.

The two comparative formulations had the following compositions:

|  | Ex. XVI | Ex. XVII |
|---|---|---|
| SBR 1502 | 100 | 100 |
| Aminox | 2 | 2 |
| Zinc Oxide | 5 | 5 |
| Stearic Acid | 5 | 5 |
| Benzothiazyl Disulfide | 1.5 | 1.5 |
| Tetramethylthiuram Disulfide | 0.25 | 0.25 |
| Sulfur | 2 | 2 |
| Light Process Oil | 5 | 5 |
| Carbon Black | 75 |  |
| Carbonaceous Silica Material |  | 75 |

The carbonaceous silica containing material in this example was similar to the material described in Examples XIII and XIV above and was originally prepared at a furnace temperature of approximately 1350°F. The material derived from the furnace was ground in a ball mill and then air classified. The material employed in preparing the rubber composition of Example XVII consisted of the finest air classified fraction.

The carbonaceous silica containing material, prior to grinding and classification, had a carbon content of about 8%. The fraction used after classification had a specific gravity of 2.09 and a surface area of 29,000 square centimeters per gram (as determined by the Blaine method described hereinbelow) and a calculated mean particle diameter of approximately one micron.

Aminox is a low temperature reaction product of acetone and diphenylamine produced by the Uniroyal Chemical Company and is an antioxidant.

The light process oil employed was an aromatic petroleum oil identified as Bearflex LPO produced by the Golden Bear Oil Co.

The carbon black employed in Example XVI was Thermax which is a trade name for a medium thermal black produced by R. T. Vanderbilt Company.

During mixing of the batches, it was noted that the carbonaceous silica material of Example XVII incorporated more readily into the dry polymer than did the carbon black of Example XVI, resulting in a lower mixing time for the composition of Example XVII.

Separate small samples of the uncured (unvulcanized) material of Examples XVI and XVII were subjected to curing rate determination by use of a Model TM 100 Monsanto Rheometer using an arc of oscillation of 1.5° at the curing temperature of 300°F. Torque was continuously measured and recorded over a 24 minute period. The recorded data indicated that cure initiated in the material of Example XVI in about 5 minutes, whereas cure initiated in the material of Example XVII in about 2 minutes. However, the material of Example XVII reached 90% cure in only 5½ minutes, while the material of Example XVI required 25 minutes to reach 90% cure. Thus, not only did the composition of this invention initiate cure faster, but it showed a very large decrease in the total required cure time.

Unvulcanized elastomeric materials exhibit a property referred to as "nerve" when they are first cut from the mold after being rolled into sheets or extruded through a die prior to curing. "Nerve" refers to a dimensional change in the material after it is released from the influence of a deforming force. It was qualitatively observed that there was a significant reduction in the amount of nerve exhibited by the material of Example XVII over that shown by the material of Example XVI.

After cure, the hardness, tensile strength, percent elongation, modulus at 100 and 300% elongation, tear strength and specific gravity were determined on the materials produced in Examples XVI and XVII.

In addition, the tensile strength, elongation, hardness and module were determined after 70 hours of heat aging in an air circulating oven at 158°F. Still further, the compression set was determined after 22 hours of aging at 158°F.

The results were as follows:

|  | Ex. XVI | Ex. XVII |
|---|---|---|
| Original Properties |  |  |
| Shore A Hardness, points (ASTM D-2240-64T) | 63 | 61 |
| Tensile Strength, psi (ASTM D412-66) | 1050 | 575 |
| Elongation, % (ASTM D412-66) | 430 | 450 |
| 300% Modulus, psi (ASTM D412-66) | 800 | 435 |
| 100% Modulus, psi (ASTM D412-66) | 300 | 225 |
| Tear Strength, pli (ASTM D624, die C) | 145 | 95 |
| Specific gravity (water displacement) | 121 | 126 |
| Properties after heat aging |  |  |
| Compression Set, % original deflection (ASTM D-395-67) | 7.5 | 10.8 |
| Shore A Hardness, points | 64 | 63 |
| Tensile Strength, psi | 1025 | 575 |
| Elongation, % | 315 | 440 |
| 100% Modulus, psi | 325 | 250 |
| 300% Modulus, psi | 1000 | 450 |

The above data indicate that the composition of this invention (the material of Example XVII) has superior heat aging characteristics when compared to the material of Example XVI.

EXAMPLE XVIII

Generally repeating the procedures employed in Examples XVI and XVII, a carbonaceous siliceous material prepared according to the method in Examples XIII and XIV containing 13.0% carbon was employed. This material had a specific gravity of 1.93, a surface area of 24,000 square centimeters per gram as determined by the Blaine method and a mean particle diameter of 1.3 microns. The furnace temperature during its preparation was approximately 1325°. The material was employed without air classification after grinding to the above referred to surface area in a ball mill.

The uncured rubber compound employed in this Example had the formulation as the compound of Example XVII except for the particular carbonaceous siliceous material employed. The following data were obtained:

| Original Properties |  |
|---|---|
| Shore A Hardness, points | 54 |
| Tensile Strength, psi | 900 |
| % Elongation | 710 |
| 100% Modulus, psi | 150 |
| 300% Modulus, psi | 350 |
| Tear Strength, pli | 120 |
| Properties after heat aging |  |
| Shore A Hardness, points | 59 |
| Tensile Strength, psi | 1050 |
| % Elongation | 650 |
| 100% Modulus | 225 |
| 300% Modulus | 500 |

EXAMPLE XIX

The procedure of Examples XVI and XVII was repeated except that the carbonaceous siliceous material employed was prepared according to the method in Examples XIII and XIV using furnace temperatures of approximately 1325°. The material effluent from the furnace was ground in a ball mill to achieve a surface area of 20,000 square centimeters per gram and a mean particle diameter of 1.5 microns. This material was employed without air classification and had a specific gravity of 1.96 and a carbon content of 11.0%.

The percentages of carbonaceous siliceous material and other components of the elastomer batch were identical to that reported in Example XVII above. The following results were obtained in the physical property tests:

| Original Properties |  |
|---|---|
| Shore A Hardness, points | 55 |
| Tensile Strength, psi | 875 |
| Elongation % | 710 |
| 100% Modulus, psi | 160 |
| 300% Modulus, psi | 250 |
| Tear Strength pli | 100 |
| Properties after heat aging |  |
| Compression set % Original deflection | 27.4 |
| Shore A Hardness, points | 58 |
| Tensile Strength, psi | 875 |
| Elongation % | 620 |
| 100% modulus, psi | 200 |
| 300% Modulus, psi | 325 |

As with the material in Examples XVII and XVIII, it was apparent that the carbonaceous siliceous material incorporated into the composition much more readily than carbon black and the resulting uncured material showed a marked improvement in the extent of the nerve exhibited.

EXAMPLES XX – XXI

Using the siliceous ash employed in Example XVII, another test series was prepared using an ethylene propylene diene terpolymer. However, instead of employing the finest carbonaceous siliceous material resulting from air classification, a coarser fraction of the carbonaceous siliceous material was employed. This material has a specific gravity 2.09, a surface area of 17,000 square centimeters per gram as determined by the Blaine method and a mean particle diameter of approximately 1.7 microns.

The procedure followed was similar to that in Examples XVI and XVII, in that comparative batches of elastomer were prepared with and without the carbonaceous siliceous material employed in the practice of this invention. The two comparative formulations had the following compositions:

|  | Ex. XX | Ex. XXI |
|---|---|---|
| Polymer | 100.00 | 100.00 |
| Zinc oxide | 5.00 | 5.00 |

-continued

|  | Ex. XX | Ex. XXI |
|---|---|---|
| Stearic Acid | 1.50 | 1.50 |
| FEF black | 50.00 | 50.00 |
| MT black | 150.00 | — |
| Carbonaceous Silica Material | — | 150.00 |
| Light process oil | 40.00 | 40.00 |
| Dipentamethylene Tetrasulfide | .75 | .75 |
| Sulfur | 2.00 | 2.00 |
| Mercaptobenzothiazole | 1.50 | 1.50 |
| Benzothiazyldisulfide | .75 | .75 |

The particular ethylene propylene diene terpolymer employed was Nordel 1470 produced by duPont. FEF black refers to fast extrusion furnace carbon black which is customarily added to some elastomer compositions to improve tensile strength. MT black refers to a medium thermal black which is ordinarily made from natural gas, has a neutral pH and a relatively large particle size compared to furnace blacks and channel blacks.

Curing of the test sheets and compression set discs was as disclosed above in Examples XVI and XVII. The following physical properties were observed:

|  | Ex. XX | Ex. XXI |
|---|---|---|
| Original Properties |  |  |
| Hardness, Shore A, points | 70 | 75 |
| Tensile Strength, psi | 1300 | 1050 |
| Elongation, % | 195 | 415 |
| Stress at 100% Elongation, % | 850 | 450 |
| Stress at 300% Elongation, % | — | 800 |
| Tear strength, die C, pli | 160 | 140 |
| Properties after heat aging |  |  |
| Compression Set, %original deflection | 18.5 | 24.7 |
| Hardness, Shore A, points | 84 | 78 |
| Tensile strength, psi | 1300 | 1225 |
| Elongation, % | 170 | 400 |
| 100% elongation, psi | 1125 | 575 |
| 300% elongation, psi | — | 975 |

Both the ease of incorporation of the filler material of Example XXI and the nerve of the resulting product were a marked improvement over the results obtained in Example XX.

EXAMPLE XXII

To further illustrate the properties of the anhydrous amorphous silica material used in the compositions of this invention, small quantities of rice hull ash prepared as above and, for example, as employed in the rubber compositions of Examples XVII – XIX and XXI, were used to take measurements of the hydrogen ion composition (pH) of that portion of the material which is soluble under certain circumstances. Procedurally, one part by weight of the rice hull ash was mixed with five parts by weight of distilled or deionized water and heated for approximately five minutes at temperatures well below the boiling point of water (160°–180°F) for about 5 minutes. pH measurements were then taken on a Beckman pH Meter and in all cases the solution was found to have a pH of from about 10.5 to about 11.2.

Similar pH measurements were taken on a precipitated hydrous amorphous silica known as Hi-Sil manufactured by Pittsburgh Plate Glass Company (Designation No. 215). After heating with the water, the resulting solution had a pH of 6.9.

Without being bound, it is believed that the fact that the alkaline material as contained in the amorphous silica ash prepared in accordance with Examples I through XV above is responsible for the fact that when the material is included in vulcanizable rubber compositions, cure times equivalent or faster than cure times realizable with carbon black are obtained. This is in direct contradistinction to the teachings of the prior art. For example, in U.S. Pat. No. 3,110,606, issued to O. L. Bertorelli, there is indicated that silica containing materials when added to uncured rubber, act as violent retarders of vulcanization.

In Examples XVII-XIX and XXI above which illustrate the inclusion of the silica material prepared generally in accordance with Examples I through XV, the determination of surface area and particle size has been made in accordance with ASTM Method C-204 (which relates generally to determination of the surface area of cementatious materials by the Blaine method) and portions of ASTM Method C-402 relating to the calculation of particle size from the data obtained in the Blaine method. In Examples I through XV particle size determinations were made in accordance with the B.E.T. Method; and these two methods are not compatible when very porous materials or materials with very high surface area are involved. It has been found that the B.E.T. Method of determining surface area indicates a higher surface area of the silica material by 1 to 2 orders of magnitude. This appears to be related to the fact that the silica material produced in accordance with Examples I through XV has a high degree of porosity in each individual particle. However, the calculation of particle size indicated in Examples XVI to XXI was based on the data obtained in measuring the surface area by the Blaine method.

It is preferred that the carbonaceous siliceous material be ground to a particle size of approximately less than 2 microns (as determined from Blaine method surface area measurements) prior to its incorporation into the rubber, plastomer or elastomer embodiments of this invention.

In Examples I through XV, and particularly Examples I - XII, it has been indicated that prolonged exposure of the silica material to temperatures in excess of 1250°F causes a substantial loss of the amorphous properties of the material. However, in Examples XIII and XIV, it has likewise been found that the apparatus employed to prepare the silica material in these examples, somewhat higher temperatures of the gas mass may be tolerated without significantly altering the amorphous nature of the material. It is theorized that in a furnace in which the silica containing agricultural material is exposed to high temperatures while in a highly turbulent condition and in which the residence time in the furnace is short, the particles of agricultural material, while undergoing incineration to the silica material, are not exposed for a sufficient length of time at the elevated temperatures to cause the transformation from amorphous to crystalline material. Thus, it is believed that the transformation from amorphous to crystalline is both a time and a temperature related phenomena as well as being dependent upon the nature of impurities present.

The herein disclosed silica material may be employed in rubber, elastomeric and plastomeric material in a wide range of percentages based on the total weight of the composition. Thus, from 5 to about 95% by weight of the herein disclosed silica material may be employed as a filler or extender in the compositions of this invention. In certain elastomeric and plastomeric compositions, it may be employed as the primary component with the elastomeric or plastomeric material acting simply as a binder. In other applications, the herein disclosed silica material (as with other fillers and extenders known to the prior art) may be used to alter the physical properties of the elastomeric or plastomeric composition. In certain applications from about 35 to about 95% by weight of the herein disclosed silica material may be employed.

In general, rubber and elastomer compositions contain a number of other components in addition to the latex or polymer starting material. These other components include the necessary vulcanizing or crosslinking agents, vulcanizing activators, vulcanizing accelerators, antioxidants, antiozonants, fillers (both reinforcing and extending), processing aids and plasticizers. There are many varieties of each of these, all of which are well known in the art; and the practice of this invention contemplates the use of the appropriate material of each included class depending on the nature of the plastomer (rubber) processor and the use to which the product is to be put.

With respect to the data in Examples XVI – XXI, the advantages of the practice of this invention and the novel compositions of matter resulting therefrom may be summarized as follows:

The rubber and plastomer composition of this invention have elongation properties comparable to or better than composition containing only medium thermal carbon black as a filler, have improved heat aging characteristics and strength generally comparable to equivalent carbon black containing composition.

In addition, the composition of this invention shows a marked reduction in nerve or shrinkage, are easier to prepare because the carbonaceous silica incorporates more readily in the polymer and serves to reduce the amount of cure accelerator required to achieve an acceptable cure rate.

Because the amorphous silica prepared from such organic materials as rice hulls is not totally free from residual carbon, the material is black, and thus has the advantage that unlike prior silica additives to rubber compositions it may be used in the preparation of non-white rubber material without the need to wash the color with carbon black.

I claim:

1. As a new composition of matter, a polymeric material selected from the class consisting of elastomers and plastomers containing from 5 to 95% by weight of a highly reactive, highly amorphous, anhydrous, siliceous material derived from organic agricultural matter, which agricultural matter has a high initial silica content of up to about 28% and which material comprises from about 49 to about 98% silica, the balance being mainly residual carbon and nonvolatile inorganic constituents of said organic agricultural matter, said material having at least about 0.3% residual carbon and from about 1 to about 5% of minor nonvolatile impurities other than calcium oxide.

2. The composition of claim 1 wherein said siliceous material is further characterized by a surface area in excess of 10 square meters per gram.

3. The composition of claim 1 wherein said polymeric material is an elastomer.

4. The composition of claim 1 wherein said polymeric material is a plastomer.

5. The composition of claim 3 wherein said siliceous material is present in from 35 to about 95% by weight of said composition.

6. As a new composition of matter, a polymeric material selected from the class consisting of elastomers and plastomers containing from 5 to 95% by weight of a highly reactive, highly amorphous anhydrous siliceous material derived from organic agricultural matter, which agricultural matter has a high initial silica content of up to about 28% and which material comprises from about 49% to about 98% silica, the balance being mainly residual carbon and nonvolatile inorganic constituents of said organic agricultural matter, said material having at least about 8.4% residual carbon and from about 1 to about 5% of minor nonvolatile impurities other than calcium oxide.

* * * * *